United States Patent
Weigl

(10) Patent No.: US 10,792,753 B2
(45) Date of Patent: Oct. 6, 2020

(54) DEVICE AND METHOD FOR THE LOW-RESISTANCE WELDING OF METAL SHEETS WITH A HIGH CYCLE RATE

(71) Applicant: GRENZEBACH MASCHINENBAU GMBH, Asbach-Baeumenheim (DE)

(72) Inventor: Markus Weigl, Donauwoerth (DE)

(73) Assignee: GRENZEBACH MASCHINENBAU GMBH, Asbach-Baeumenheim (DE)

( * ) Notice: Subject to any disclaimer, the term of this patent is extended or adjusted under 35 U.S.C. 154(b) by 347 days.

(21) Appl. No.: 15/751,275

(22) PCT Filed: Aug. 10, 2016

(86) PCT No.: PCT/DE2016/000313
§ 371 (c)(1),
(2) Date: Feb. 8, 2018

(87) PCT Pub. No.: WO2017/028833
PCT Pub. Date: Feb. 23, 2017

(65) Prior Publication Data
US 2018/0236590 A1 Aug. 23, 2018

(30) Foreign Application Priority Data
Aug. 17, 2015 (DE) .................. 10 2015 010 734

(51) Int. Cl.
| | | |
|---|---|---|
| *B23K 11/11* | (2006.01) | |
| *B23K 11/30* | (2006.01) | |
| *B23K 11/31* | (2006.01) | |
| *B23K 11/36* | (2006.01) | |
| *B23K 11/00* | (2006.01) | |

(52) U.S. Cl.
CPC ......... *B23K 11/115* (2013.01); *B23K 11/0026* (2013.01); *B23K 11/3009* (2013.01); *B23K 11/314* (2013.01); *B23K 11/315* (2013.01); *B23K 11/36* (2013.01)

(58) Field of Classification Search
CPC ..... B23K 11/115; B23K 11/315; B23K 11/36; B23K 11/0026; B23K 11/314; B23K 11/3009
See application file for complete search history.

(56) References Cited

U.S. PATENT DOCUMENTS 1,378,520 A * 5/1921 Bradley ............. B23K 11/0026
101/28
1,677,206 A * 7/1928 Pugh .................. B23K 11/0026
219/119

(Continued)

FOREIGN PATENT DOCUMENTS

| CN | 1432447 | 7/2003 |
| CN | 104661771 | 5/2015 |

(Continued)

OTHER PUBLICATIONS

Niu et al., "Dynamic Electrode Force Control of Resistance Spot Welding Robot", Proceedings of the 2009 IEEE Conference on Robotics and Biometrics, Dec. 19, 2009, pp. 2421-2426.

*Primary Examiner* — Donnell A Long
(74) *Attorney, Agent, or Firm* — Duane Morris LLP; Gregory M. Lefkowitz

(57) ABSTRACT

The invention relates to an apparatus and a method for the low-resistance welding of metal sheets with a high cycle rate.

11 Claims, 4 Drawing Sheets

(56) References Cited

U.S. PATENT DOCUMENTS

Figure 1:
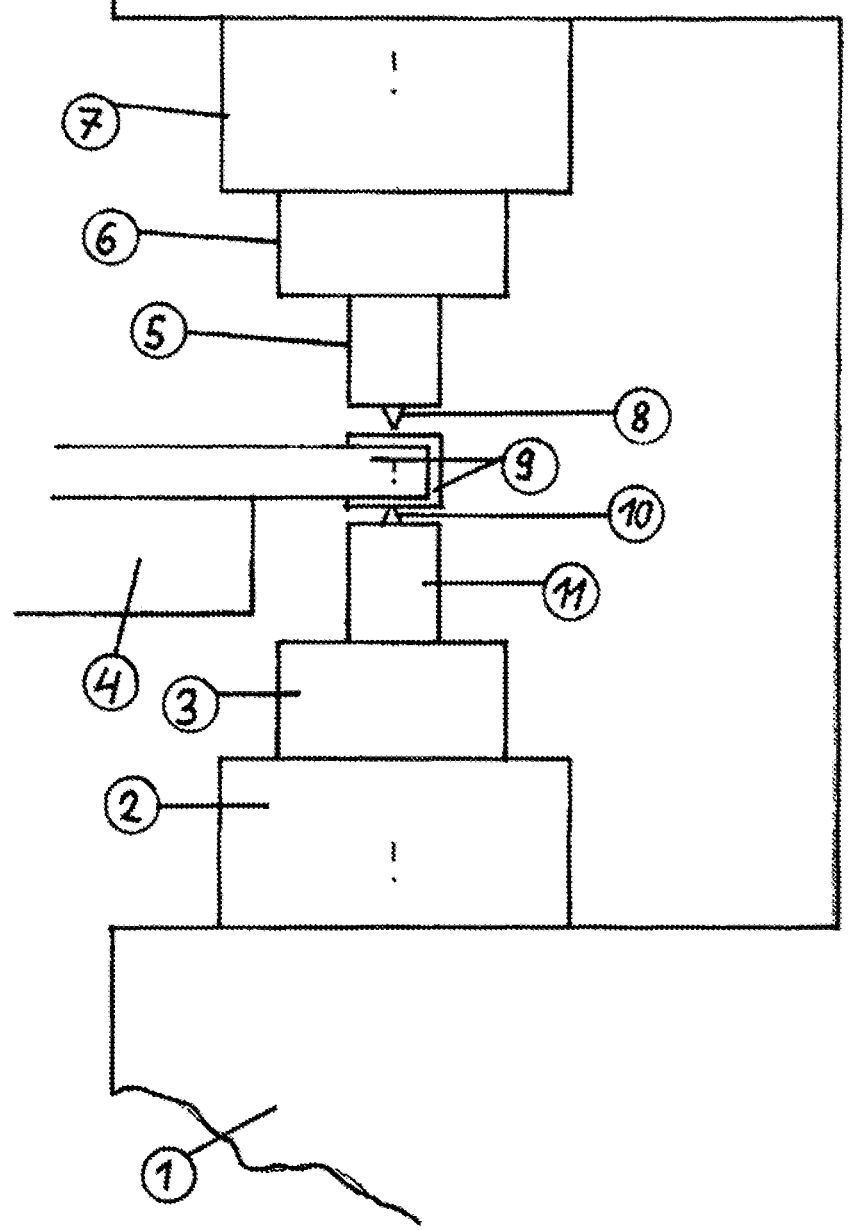

| | | | | |
|---|---|---|---|---|
| 2,238,679 | A * | 4/1941 | Cooper | B23K 11/28 |
| | | | | 219/86.21 |
| 2,358,155 | A * | 9/1944 | Frederick | B23K 11/314 |
| | | | | 219/89 |
| 4,256,946 | A * | 3/1981 | Eberle | B23K 11/3009 |
| | | | | 219/119 |
| 4,831,228 | A | 5/1989 | Schumacher | |
| 6,037,559 | A * | 3/2000 | Okabe | B23K 11/115 |
| | | | | 219/91.23 |
| 8,993,918 | B2 | 3/2015 | Sakai et al. | |
| 2007/0007253 | A1* | 1/2007 | Wang | B23K 11/115 |
| | | | | 219/86.25 |
| 2008/0302766 | A1* | 12/2008 | Hirsch | B23K 11/115 |
| | | | | 219/108 |
| 2009/0120922 | A1* | 5/2009 | Schutte | B23K 11/36 |
| | | | | 219/158 |
| 2010/0301795 | A1* | 12/2010 | Sato | B23K 11/31 |
| | | | | 318/646 |
| 2013/0015164 | A1* | 1/2013 | Sigler | B23K 11/115 |
| | | | | 219/87 |
| 2015/0283644 | A1* | 10/2015 | Kawai | B25J 9/1697 |
| | | | | 219/82 |
| 2016/0158874 | A1* | 6/2016 | Wang | B23K 11/115 |
| 2016/0221643 | A1* | 8/2016 | Smits | B63B 3/20 |
| 2017/0320669 | A1* | 11/2017 | Kilibarda | B62D 65/18 |

FOREIGN PATENT DOCUMENTS

| | | |
|---|---|---|
| DE | 1902569 | 11/1970 |
| DE | 1944614 | 3/1971 |
| DE | 4038016 | 6/1992 |
| DE | 102004038208 | 2/2006 |
| DE | 202004020166 | 5/2006 |
| DE | 102009049329 | 4/2011 |
| DE | 102013216820 | 2/2015 |
| DE | 202013105396 | 3/2015 |
| EP | 0005880 | 12/1979 |
| JP | S4947072 | 5/1974 |
| JP | H0192535 | 4/1989 |
| JP | H0622461 | 1/1994 |
| JP | H07328772 | 12/1995 |
| JP | H08132253 | 5/1996 |
| JP | H10225776 | 8/1998 |
| JP | 2001096372 | 4/2001 |
| JP | 2009045657 | 3/2009 |

* cited by examiner

DEVICE AND METHOD FOR THE LOW-RESISTANCE WELDING OF METAL SHEETS WITH A HIGH CYCLE RATE

CROSS-REFERENCE TO RELATED APPLICATIONS

This application is a § 371 national stage entry of International Application No. PCT/DE2016/000313, filed on Aug. 10, 2016, which claims priority to German Patent Application No. 10 2015 010 734.8, filed Aug. 17, 2015, the entire contents of which are incorporated herein by reference.

The invention relates to an apparatus and a method for the low-resistance welding of metal sheets with a high cycle rate.

With regard to the prior art, a method for the resistance welding and resistance soldering or arc welding of coated metal sheets and machines therefor are known from the patent literature from the German laid-open specification 19 02 569.

According to the preamble of claim 1, said document proceeds from a method for the resistance welding or for the electrical resistance soldering of metal sheets and metal bodies.

According to the characterizing part of claim 1, said method is characterized in that pointed extensions are formed (for example by punching, embossing, milling and the like) on the metal sheet to be welded, in the direction of the decorative sheet, which, for example, is coated fully on both sides, said extensions being heated so much by a preheating current, which is initially passed through the (upper) metal sheet to be welded, that, as a result, the inner coating of the decorative sheet melts (or is destroyed), the pointed extensions come into metallic contact with the decorative sheet and a welding current is passed into the decorative sheet, by automatic control or other circuits and control means, with optimum welding data, which rule out damage to the decorative layer, via contact points, thereby welding the metal sheets.

Furthermore, a welding apparatus having a welding part is known from the more recent DE 20 2004 020 166 U1. That document proceeds from prior art in which pulse welding with a pressing force acting on the components to be welded is known. In that connection, conventional capacitor discharge welding methods together with associated welding apparatuses are considered for example. In such pulse welding methods, the pressed-together workpieces have a pulse current flowing through them, wherein they pass into a pasty state in the contact region and are joined together. In order to achieve a sufficiently high current concentration, it is further stated therein that the contact points of the workpieces are kept as small as possible, wherein there is point contact or linear contact, for example. In the case of metal sheets, to this end, bosses are applied to or integrally formed on one or both metal sheets during component preparation. This requires additional effort.

Furthermore, with regard to the prior art, DE 40 38 016 A1 and DE 19 44 614 A1 are mentioned.

In DE 20 2004 020 166 U1, the object mentioned is that of indicating an improved welding technique in light of the above-described prior art.

In order to achieve said object, claim 1 proceeds from a welding apparatus for the pulse welding of workpieces (3, 4) with a welding current source (10), at least two electrodes (12, 13) and an electrode contact-pressure apparatus (11).

Said welding apparatus is characterized in that at least one electrode (12) has a punch (14), protruding from the electrode front wall in the infeed direction (15), for deforming a workpiece (3) subjected thereto at the welding point (7).

The present invention is based on the object of specifying an apparatus and a method with which the secure welding of metal sheets at a high cycle rate is allowed. In this case, the contact resistance at the welding point should be as low as possible, i.e. low-resistance. The service life of the tools and the entire process reliability should meet high demands in this case.

This object is achieved by the apparatus as claimed in claim 1:

An apparatus for the low-resistance welding of metal sheets with a high cycle rate, having the following features:
  a) a main body (1) formed in a U-shaped manner, in the two horizontally mounted legs of which a lower lift drive element (2) and an upper lift drive element (7), which are located opposite one another, are arranged, wherein a lower electrode holding device (3) follows the lower lift drive element (2) and an upper electrode holding device (6) follows the upper lift drive element (7) in the direction of the acting force,
  b) a lower welding electrode (11) held by the lower electrode holding device (3) and an upper welding electrode (5) held by the upper electrode holding device (6), wherein the lower welding electrode (11) bears a lower embossing head (10) that is arranged centrally in each case and tapers to a point, and the upper welding electrode (5) bears an upper embossing head (8),
  c) a joining-partner feeding device (4) which conveys the joining partners (9) to be welded into the intermediate space between the two embossing heads (10, 8),
  d) a power source that supplies a the welding current adapted to the joining partners (9).

Moreover, it is claimed that the two embossing heads (10, 8) each have a preloading element (15), the preload of which can be set by means of at least one setting element (12), wherein the preload can be measured by means of a force measuring sensor (13), and it is claimed that the pressure force exerted on each particular electrode holding device (3, 6) in each case by a lift drive element (2, 7) can be measured with a force measuring sensor (14). It is moreover claimed that an embossing head (10, 8) is made of ceramic or some other hard, nonconductive material.

and by the method as claimed in claim 5:

A method for the low-resistance welding of metal sheets with a high cycle rate, having the following features:
  a) the joining partners to be welded are conveyed by a joining-partner feeding device (4) to between a lower welding electrode (11) and an upper welding electrode (5) where they are fixed by one and/or two embossing heads (10, 8) with a particular, settable preload,
  b) the lower welding electrode (11) and the upper welding electrode (5) are pressed onto the two joining partners from both sides, wherein the electrode pressure is measured in each case,
  c) the welding current appropriate for the respective joining partners flows and welds the joining partners,
  d) the two welding electrodes with their respective embossing heads (19, 8) are retracted by means of a corresponding lift drive element (2, 7) and the joining-partner feeding device (4) delivers the welding result into a temporary storage area, and that an embossing head (10, 8) can be set with respect to the joining partner by means of a setting element (12) during the process, independently of the particular welding electrode (11, 5) and the electrode pressure.

It is furthermore claimed that an embossing head (10, 8) can, depending on the material pair, increase or reduce the pressure on the particular joining partner or can be extracted entirely from the welding zone, independently of the position of an electrode after the embossing operation. Also claimed is a computer program having a program code for carrying out the method steps when the program is run on a computer, and a machine-readable carrier having the program code of a computer program for carrying out the method when the program is run on a computer.

The apparatus according to the invention is described in more detail in the following text.

Figure 2:
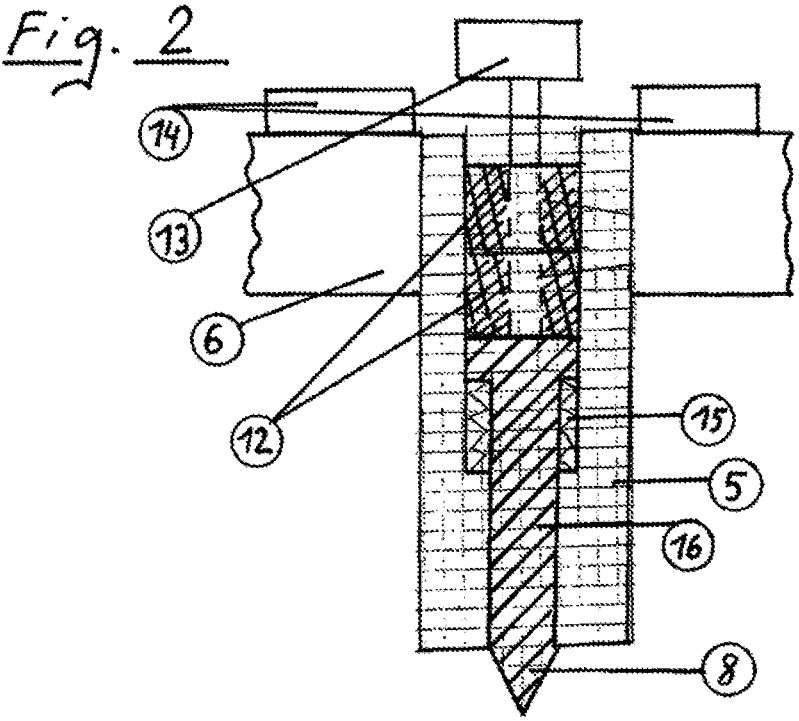
Figure 2:
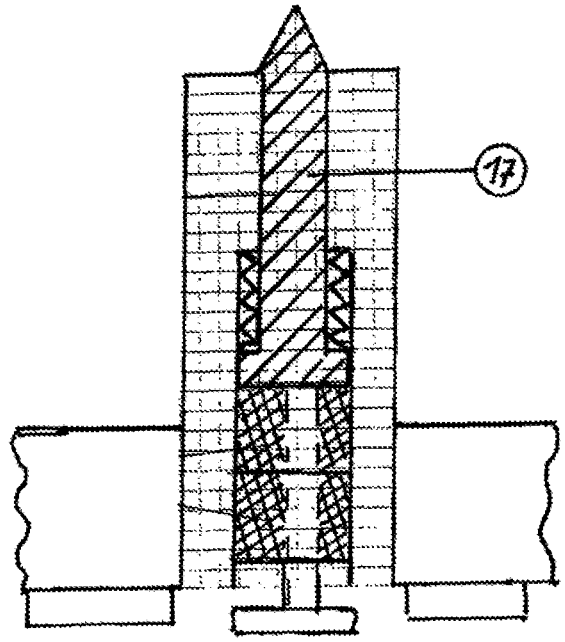
Figure 3:
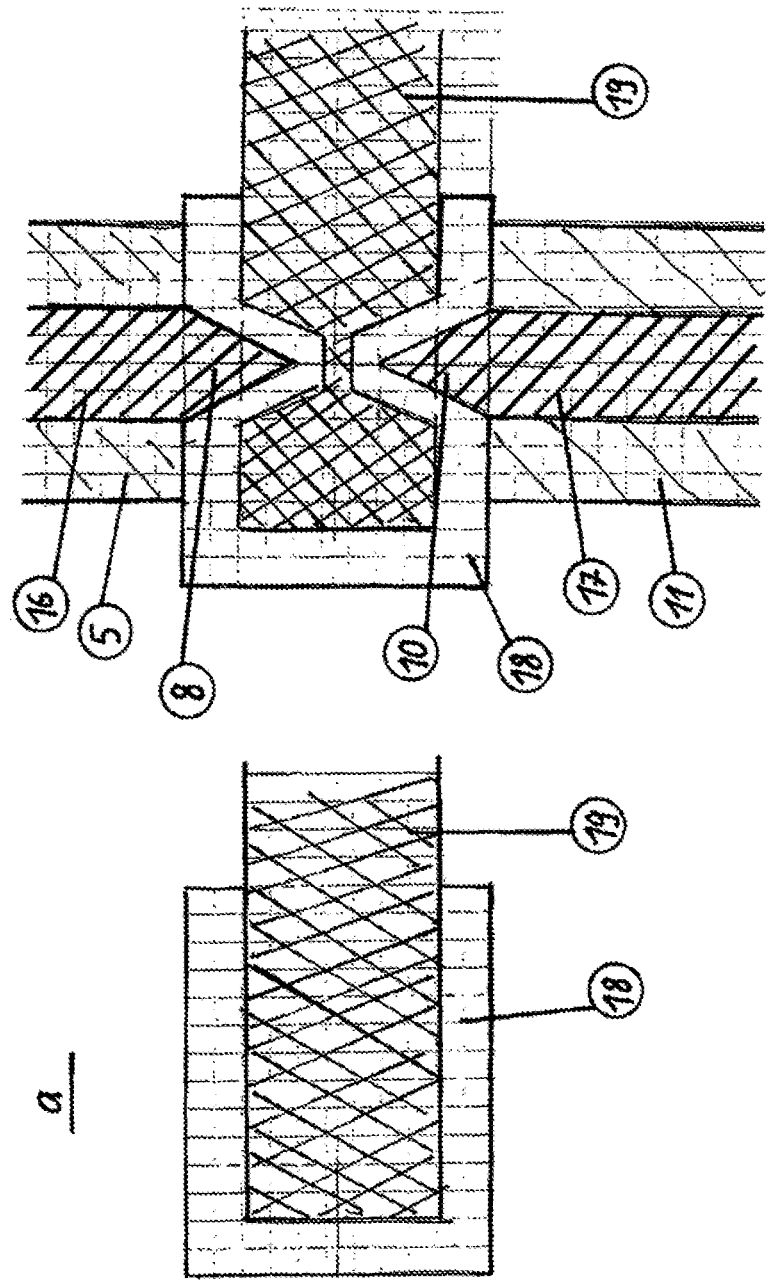
Figure 4:
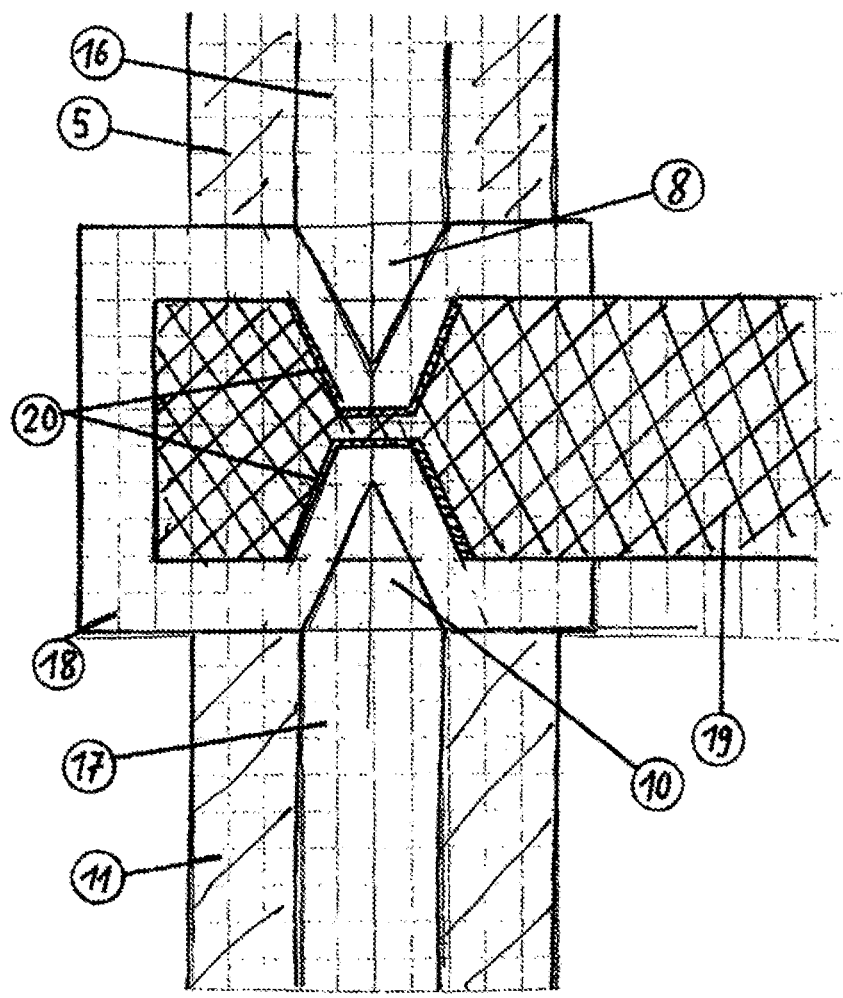

Specifically:

FIG. 1 shows a cross section through the apparatus according to the invention FIG. 2 shows a sectional illustration in the region of the embossing heads FIG. 3 shows two sectional illustrations in the region of the welding operation FIG. 4 shows a direct sectional illustration of the weld FIG. 1 shows a cross section through the apparatus according to the invention. The pincer-shaped main body 1 of the welding apparatus has substantially a lower lift drive element 2 and an upper lift drive element 7, between which two joining partners 9 for a welding operation to be carried out are fed in an exactly positioned manner by means of a joining-partner feeding device 4. The two joining partners 9 to be welded that are shown here consist for example of an elongate sheet-metal strip, shown in section, which is intended to be welded to a different, further sheet-metal strip that is bent in a U shape and clasps the elongate sheet-metal strip.

Involved directly in this welding operation are two embossing heads, depicted here as pressure spikes, specifically the lower embossing head 10 and the upper embossing head 8. These two embossing heads 10 and 8 are directly connected to the corresponding lower welding electrode 11 and the upper welding electrode 5. The two welding electrodes 11 and 5 are in turn each held by the corresponding lower electrode holding device 3 and the upper electrode holding device 6.

In this case, both the lower electrode holding device 3 and the upper electrode holding device 6 each have separate force measuring devices that act independently of one another.

The two electrode holding devices are actuated by the lower lift drive element 2 and the upper lift drive element 7.

FIG. 2 shows a sectional illustration in the region of the embossing heads. Proceeding from the upper welding electrode 5 known from FIG. 1 and the upper electrode holding device 6 with its force measuring device, in addition to the upper embossing head 8, the shank 16 of the upper embossing head 8 with its preloading element 15 can be seen here by way of example. Via the shank 16 of the upper embossing head, two setting elements 12 that are connected in series in terms of force are illustrated, with the aid of which the preload of the preloading element 15 can be set, for example as spring preload. As setting elements 12, use can be made for example of piezoelectric elements. In order to measure this preload, use is made of a force measuring sensor 13. By means of a further force measuring sensor 14, the electrode pressure which is exerted on the upper welding electrode 6 by the upper lift drive element 7 can be measured. In the lower part of FIG. 2, the corresponding shank of the lower embossing die is denoted by 17. The other components (not shown), such as the setting elements 12, the force measuring sensor 13, the preloading element 15 and the force measuring sensor 14 for the electrode pressure also correspond to the arrangement described in the upper part of FIG. 2.

FIG. 3 shows two sectional illustrations in the region of the welding operation.

Illustrated in the left-hand FIG. 3*a* as examples of metal sheets to be welded are a sheet made of metal structure material 19, as a first joining partner, and a metal surround 18 that clasps said sheet 19 in a U-shaped manner, as a further, second joining partner. This illustration corresponds to the conditions shown in FIG. 1, just laterally reversed.

In the right-hand FIG. 3*b*, the joining partners shown in FIG. 3*a* are shown in section after the mechanical action by the embossing heads.

The metal sheet made of metal structure material 19 that is shown here by way of example is characterized, as already suggested by its name, in that it consists substantially of a grating-like metal structure with voids in between. Such a metal sheet is by its nature less resistant to a pressure load exerted by means of a pointed embossing head than a corresponding metal sheet made of normal metal. This can be seen in FIG. 3*b* in that the metal structure material 19 is highly deformed in the middle by the force action of the shanks 17 and 16 of the two embossing heads 10 and 8, while the metal surround 18 displays more of a normal deformation behavior. The lower welding electrode 11 and the upper welding electrode 5 are still currentless in this illustration.

FIG. 4 shows a direct sectional illustration of the weld. This illustration differs from FIG. 3*b* in that, after the flow of a welding current, an intimate weld 20 has formed at the mechanical connecting surfaces of the metal structure material 19 and the metal surround 18.

The welding process described is controlled once by means of the setting elements 12 which determine the preload with which the particular embossing head acts on the corresponding joining partner, wherein the preload is measured by means of the corresponding force measuring sensor 13.

Furthermore, the pressure of the welding electrodes on the joining partners is exerted by means of the corresponding lift drive elements and measured by means of the corresponding force measuring sensors 14.

The control and the type of welding current depend on the type and configuration of the respective joining partners, wherein the cycle rate of the feeding device for the joining partners determines the cycle rate of the welding apparatus. In this case, a cycle rate of at least 1200 welding operations per hour is achieved.

The level of the welding current is kept low, wherein care is taken to ensure that the welding electrodes are not coated with the material of the joining partners, in order to avoid any adhesion of the joining partners to the welding electrodes. Thus, high reliability and a high cycle rate can be achieved.

The pressure of an embossing head can be set, during the processing process, by a setting element independently of the welding electrode and the electrode pressure on the joining partner.

Each particular embossing head produces, in the joining partner, an ignition tip along which the subsequent weld seam extends. In this way, good conductivity of the welding is achieved. An embossing head can be made of ceramic or some other hard, poorly conductive material. Embossing tips prevent any displacement of the joining partners during welding, this being important at the achievable high cycle rate. Depending on the material pair, an embossing head can increase or reduce the pressure on the joining partner or can be extracted entirely from the welding zone, independently of the electrode after the embossing operation.

Both welding electrodes with their embossing heads and the corresponding lift drive element can be involved in a welding operation, but it is also possible for one welding electrode with its embossing head to remain virtually static and not to be involved in the welding operation with its embossing head and the lift drive element in question. This, of course, does not affect the electrical function of the welding electrodes.

Furthermore, in a special design (not shown), the function of measuring the ohmic resistance can additionally be provided before the actual welding operation is carried out. In this way, as a result of the tips of the embossing heads coming into contact with the joining partners before the actual welding operation, it is possible to estimate the ohmic resistance that the finished weld will have. Should this resistance measurement not correspond to the desired value, the result of the welding can still be influenced before the welding operation by means of an additional pressure increase on the joining partners. Reference values for a corresponding estimate are obtained in specific cases by means of corresponding measurement series.

As a result, the reliability of the entire installation can be increased substantially.

Joining partners are preferably materials such as structure metals which have voids in the interior (for example metal foams).

However, it is of course also possible to use other materials as joining partners.

The complex control of the movement sequences described requires a special control program.

LIST OF REFERENCE SIGNS

1 Main body of the welding apparatus
2 Lower lift drive element
3 Lower electrode holding device with force measuring device
4 Joining-partner feeding device
5 Upper welding electrode
6 Upper electrode holding device with force measuring device
7 Upper lift drive element
8 Upper embossing head
9 Joining partner
10 Lower embossing head
11 Lower welding electrode
12 Setting elements for upper embossing die
13 Force measuring sensor for embossing die
14 Force measuring sensor for electrode pressure
15 Preloading element (spring element)
16 Shank of the upper embossing die
17 Shank of the lower embossing die
18 Metal surround (contact sheet)
19 Metal structure material
20 Weld

The invention claimed is:

1. An apparatus for the low-resistance welding of metal sheets with a high cycle rate, having the following features:
    a) a main body (1) formed in a U-shaped manner, in two horizontally mounted legs of which comprise a lower lift drive element (2) and an upper lift drive element (7), which are located opposite one another, are arranged, wherein a lower electrode holding device (3) follows the lower lift drive element (2) and an upper electrode holding device (6) follows the upper lift drive element (7) in the direction of the acting force,
    b) a lower welding electrode (11) held by the lower electrode holding device (3) and an upper welding electrode (5) held by the upper electrode holding device (6), wherein the lower welding electrode (11) bears a lower embossing head (10) that is arranged centrally in each case and tapers to a point, and the upper welding electrode (5) bears an upper embossing head (8),
    c) a joining-partner feeding device (4) which conveys joining partners (9) to be welded into the intermediate space between the two embossing heads (10, 8),
    d) a power source that supplies a the welding current adapted to the joining partners (9),
    wherein (i) at least one of upper embossing head or the lower embossing head is adapted to be set with respect to the joining partner by means of a setting element during welding, independently of the upper welding electrode or lower welding electrode and the electrode pressure,
    (ii) at least one of the upper embossing head or the lower embossing head is adapted to increase or reduce the pressure on the particular joining partner or can be extracted entirely from the welding zone, independently of the position of an electrode after the embossing operation, or
    (iii) both option (i) and option (ii).

2. The apparatus as claimed in claim 1, characterized in that the two embossing heads (10, 8) each have a preloading element (15), the preload of which can be set by means of at least one setting element (12), wherein the preload can be measured by means of a force measuring sensor (13).

3. The apparatus as claimed in claim 1, characterized in that the pressure force exerted on each particular electrode holding device (3, 6) in each case by a lift drive element (2, 7) can be measured with a force measuring sensor (14).

4. The apparatus as claimed in claim 1, characterized in that an embossing head (10, 8) is made of ceramic or some other hard, nonconductive material.

5. The apparatus as claimed in claim 1, wherein (i) at least one of upper embossing head or the lower embossing head is adapted to be set with respect to the joining partner by means of a setting element during welding, independently of the upper welding electrode or lower welding electrode and the electrode pressure.

6. The apparatus as claimed in claim 1, wherein (ii) at least one of the upper embossing head or the lower embossing head is adapted to increase or reduce the pressure on the particular joining partner or can be extracted entirely from the welding zone, independently of the position of an electrode after the embossing operation.

7. A method for the low-resistance welding of metal sheets with a high cycle rate, having the following features:
    a) joining partners to be welded are conveyed by a joining-partner feeding device (4) to between a lower welding electrode (11) and an upper welding electrode (5) where they are fixed by one and/or two embossing heads (10, 8) with a particular, settable preload, b) the lower welding electrode (11) and the upper welding electrode (5) are pressed onto the two joining partners from both sides, wherein the electrode pressure is measured in each case, c) the welding current appropriate for the respective joining partners flows and welds the joining partners, d) the two welding electrodes with their respective embossing heads (19, 8) are retracted by means of a corresponding lift drive element (2, 7) and the joining-partner feeding device (4) delivers the welding result into a temporary storage area, wherein (i) an embossing head (10, 8) can be set with respect to the joining partner by means of a setting element (12) during the process, independently of the particular welding electrode (11, 5) and the electrode pressure, (ii) an embossing head (10, 8) can, depending on the material pair, increase or reduce the pressure on the particular joining partner or can be extracted entirely from the welding zone, independently of the position of an electrode after the embossing operation, or (iii) both option (i) and option (ii).

8. The method as claimed in claim 7, characterized in that an embossing head (10, 8) can be set with respect to the joining partner by means of a setting element (12) during the process, independently of the particular welding electrode (11, 5) and the electrode pressure.

9. The method as claimed in claim 7, characterized in that an embossing head (10, 8) can, depending on the material pair, increase or reduce the pressure on the particular joining partner or can be extracted entirely from the welding zone, independently of the position of an electrode after the embossing operation.

10. A computer program having a program code for carrying out the method steps as claimed in claim 7 when the program is run on a computer.

11. A machine-readable carrier having the program code of a computer program for carrying out the method as claimed in claim 7 when the program is run on a computer.

\* \* \* \* \*